United States Patent [19]
Lind

[11] Patent Number: 5,334,917
[45] Date of Patent: Aug. 2, 1994

[54] SYSTEM AND METHOD FOR OPTIMALLY DRIVING A DC MOTOR

[75] Inventor: Bjorn Lind, Billdal, Sweden

[73] Assignee: W. Schlafhorst AG & Co., Monchengladbach, Fed. Rep. of Germany

[21] Appl. No.: 937,995

[22] Filed: Aug. 28, 1992

Related U.S. Application Data

[63] Continuation-in-part of Ser. No. 720,892, Jun. 25, 1991, abandoned.

[51] Int. Cl.⁵ .............................................. H02P 7/00
[52] U.S. Cl. .................................. 318/254; 318/439
[58] Field of Search ......... 318/254, 138, 439, 799–812

[56] References Cited

U.S. PATENT DOCUMENTS

| | | |
|---|---|---|
| 3,611,085 | 10/1971 | Rosenberry, Jr. . |
| 4,495,450 | 11/1985 | Tokizaki et al. . |
| 4,641,066 | 2/1987 | Nagata et al. ............ 318/254 |
| 4,678,973 | 7/1987 | Elliott et al. ............. 318/254 |
| 4,712,050 | 12/1987 | Nagasawa et al. ........ 318/254 |
| 4,743,815 | 5/1988 | Gee et al. .............. 318/138 X |
| 4,874,993 | 10/1989 | Tanaka et al. ............ 318/254 |
| 4,928,043 | 5/1990 | Plunkett ................ 318/254 |
| 4,983,894 | 1/1991 | Oku et al. .............. 318/138 |
| 5,017,845 | 5/1991 | Carbolante et al. ...... 318/138 |

FOREIGN PATENT DOCUMENTS

| | | |
|---|---|---|
| 0071941 | 2/1983 | European Pat. Off. . |
| 0121144 | 10/1984 | European Pat. Off. . |
| 0251785 | 1/1988 | European Pat. Off. . |
| 0316077 | 5/1989 | European Pat. Off. . |
| 0363169 | 4/1990 | European Pat. Off. . |
| 3209394 | 9/1984 | Fed. Rep. of Germany . |
| 62-44093 | 2/1987 | Japan . |
| 63-11085 | 1/1988 | Japan . |
| 61-170291 | 1/1988 | Japan . |
| 90/15473 | 12/1990 | World Int. Prop. O. . |

OTHER PUBLICATIONS

Perret et al., "Minimization of torque ripple in brushless DC motor drivers", Oct. 11, 1985, IEEE-IAS Annual Meeting, p. 790.

*Primary Examiner*—Jonathan Wysocki
*Attorney, Agent, or Firm*—Merchant & Gould, Smith, Edell, Welter & Schmidt

[57] ABSTRACT

Method and a device in a drive system for a DC-motor including an inverter and a multiple phase synchronous motor with a permanent magnet rotor, and provided with a rotor position detection means in order to generate a rotation dependent logical position signal or signals. An optimization is carried out, which is based on the rotation dependent logical signals (POS1, POS2, POS3) from said rotor position detection means whereby the commutation points each are displaced such, that at said optimization minimum input current is detected to eliminate poor operation caused by unsymmetries in the motor iron or windings as well as unsymmetries of the rotor magnet and thereby optimize motor performance with respect to e.g. efficiency at present velocity and load, maximum acceleration and motor vibrations.

3 Claims, 11 Drawing Sheets

SYSTEM AND METHOD FOR OPTIMALLY DRIVING A DC MOTOR

This is a continuation-in-part of application Ser. No. 07/720892, filed Jun. 25, 1991 now abandoned.

The present invention refers to an inverter for brushless DC-operated electrical motors. In particular the invention refers to a method to control the commutation of a DC-motor comprising an inverter and a multiple phase synchronous motor with a permanent magnet rotor, and provided with a rotor position detection means in order to generate a rotation dependent position signal or signals.

BACKGROUND OF THE INVENTION

A brushless or commutator free DC- motor generally comprises a permanent magnet synchronous motor which is fed by an inverter controlled by magnetic or optical sensors arranged at the motor shaft, said sensors provide a pattern of output signals corresponding to the rotor position of said motor. The output signals are then processed in logic circuits and control the output bridge of the inverter. A synchronous motor with a feeding equipment of the type is normally self-commutating, that is, it operates basically in the same way as a DC -motor with mechanical commutation.

In conventional DC brushless motors designed for rotational speeds up to 10,000 rpm switching losses in the motor windings and slight unsymmetries in the commutation detection circuits (which could be of type optic, magnetic or Back-EMF) normally do not cause any problems. However in a high speed motor a slight unsymmetry or displacement of the commutation points may cause very high losses e.g. in the magnitude of the rated power and might damage the motor. The design of the inverter has to be such that the majority of heat losses are dissipated in the inverter and not in the stator coils and core which are very sensitive to heating.

Thus the reference commutation points which have been obtained either by external shaft position encoders or internally by Back-EMF detection have to be displaced a) individual angles with respect to unsymmetries of the rotor and stator and b) all with the same amount of angle when e.g. the armature reaction has to be compensated for.

Various motor speeds as well as different motor species give different sets of commutation time points.

In order to keep the losses of the synchronous motor as small as possible, the waveform of the output voltage from the inverter should be adapted as well as possible to the waveform of the back- EMF generated by the motor, which normally is sinusoidal. By using switching technique in the inverter, the losses in this can be kept low, but consideration must also be taken to influence of harmonics in the stator winding which are generated as a result of the square wave of the inverter and which harmonics do not contribute to the torque of the synchronous motor.

When inverting at high operating frequencies corresponding to high rotational speeds (100,000 r.p.m) of the motor in question it is essential to keep the number of switchings per electric feeding period as low as possible in order to avoid substantial losses in the inverter. At high r.p.m. it is also important that the switching is performed in such a way that the output power per volume unit will be as large as possible. The difference between the calculated mechanical setting of the magnetic sensors (e.g. Hall sensors) or optical sensors and the actual setting which is influenced by unsymmetries of the rotor, the stator windings and stator iron is critical with respect to the efficiency of the motor especially at high rotor speeds. This increases the costs of production of such a motor since measures have to be taken for a final adjustment of the sensors. In certain cases also separate commutating magnets are used in order to avoid influence from the stator field, which involves an additional material and assembly cost in addition to the costs of a device for final adjustment and the sensors per se.

THE OBJECTS OF THE INVENTION AND ESSENTIAL FEATURES

It is a first object of the invention to provide an inverter for a brushless motor drive system in which the number of switchings per electric current supply period is reduced to a minimum.

A second object of the invention is to provide a method to optimize the inverter drive system for a self-commutating DC supplied permanent magnet synchronous motor dynamically with respect to efficiency at the present velocity and load condition, maximum acceleration and motor vibrations.

The above objects are achieved according to the present invention by providing a three phase inverter with voltage stiff output and 180° commutation angle for the commutation signals, and by the commutation points based on the rotation dependent logical signals from said rotor position detection means each being displaced by a commutation control unit individually such, that an optimization can be carried out to eliminate poor operation caused by unsymmetries in the motor iron or the windings as well as unsymmetries of the rotor magnet and a method for driving the DC-motor comprises a) performing optimization based upon the logical position signals from the position detecting mechanism whereby the commutation points derived from said position signals are each individually displaced by a commutation control unit according to a certain scheme;

b) detecting the input current level when controlling the commutation for minimum power dissipation in the permanent magnet motor to optimize motor performance by reducing motor vibrations, maximizing motor acceleration, and providing efficient operation at given velocity and load.

With reference to the accompanying drawing in the following preferred embodiments of the present invention are described.

IN THE DRAWING

Figure 6:
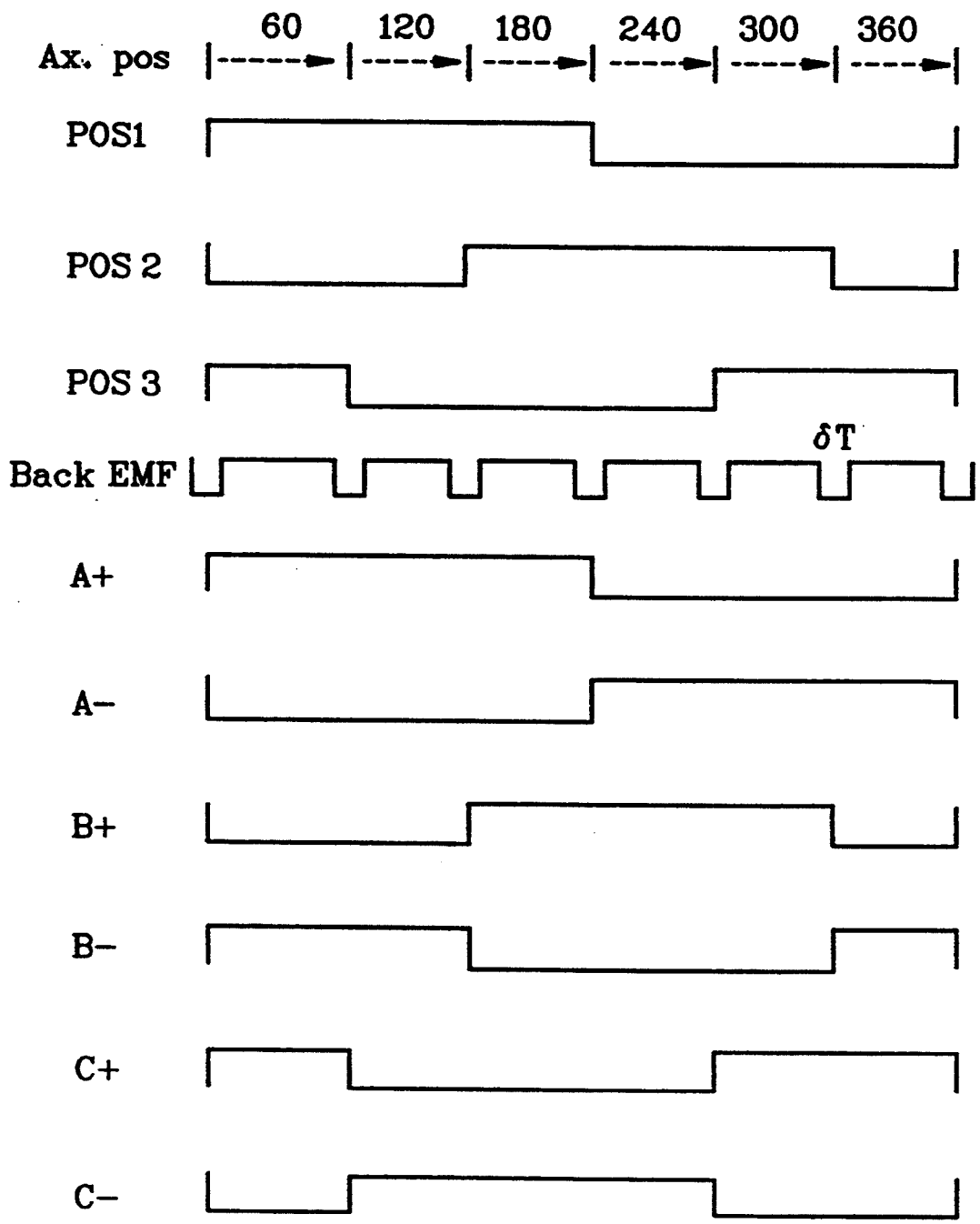
Figure 7:
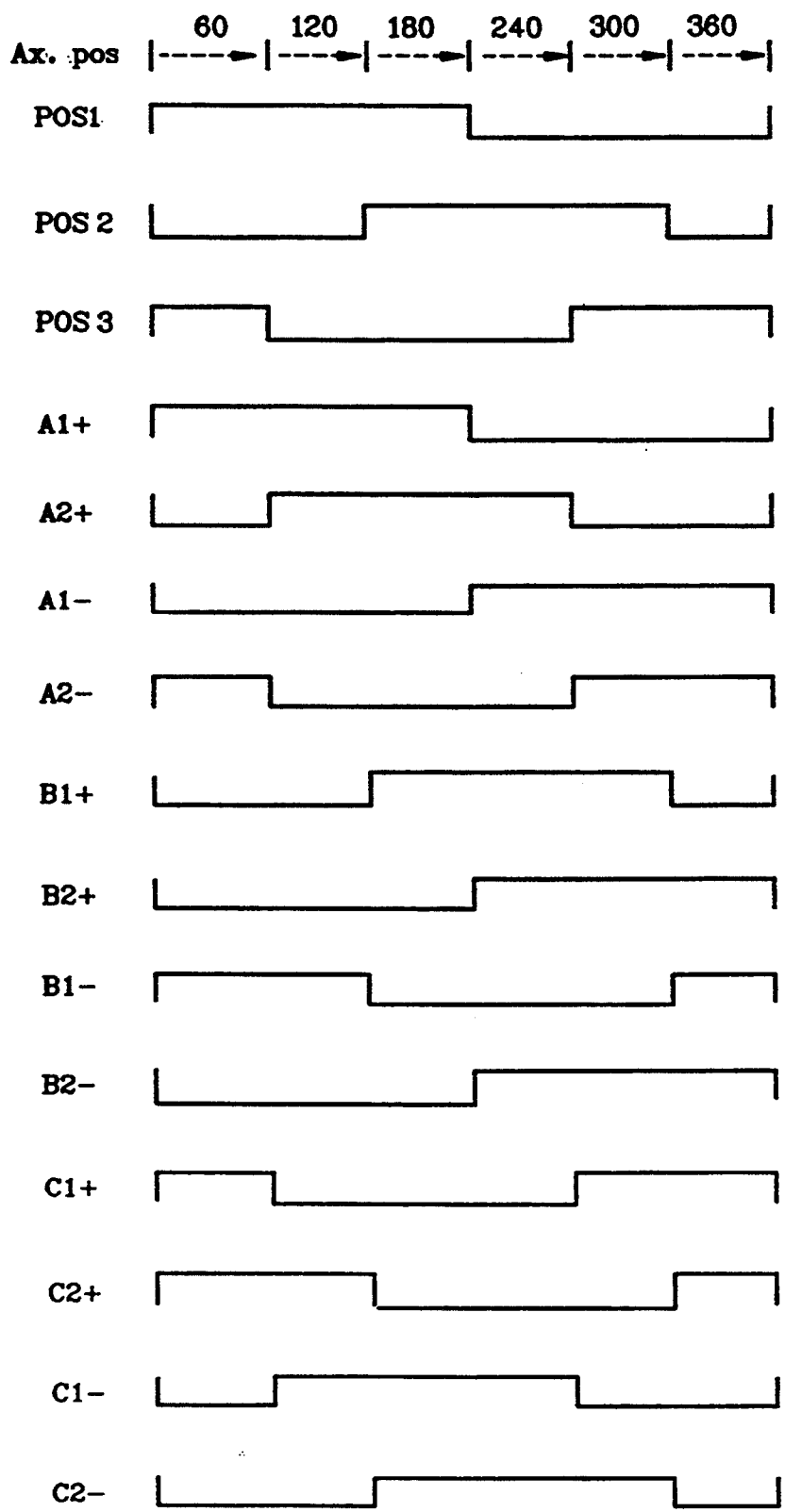
Figure 8A:
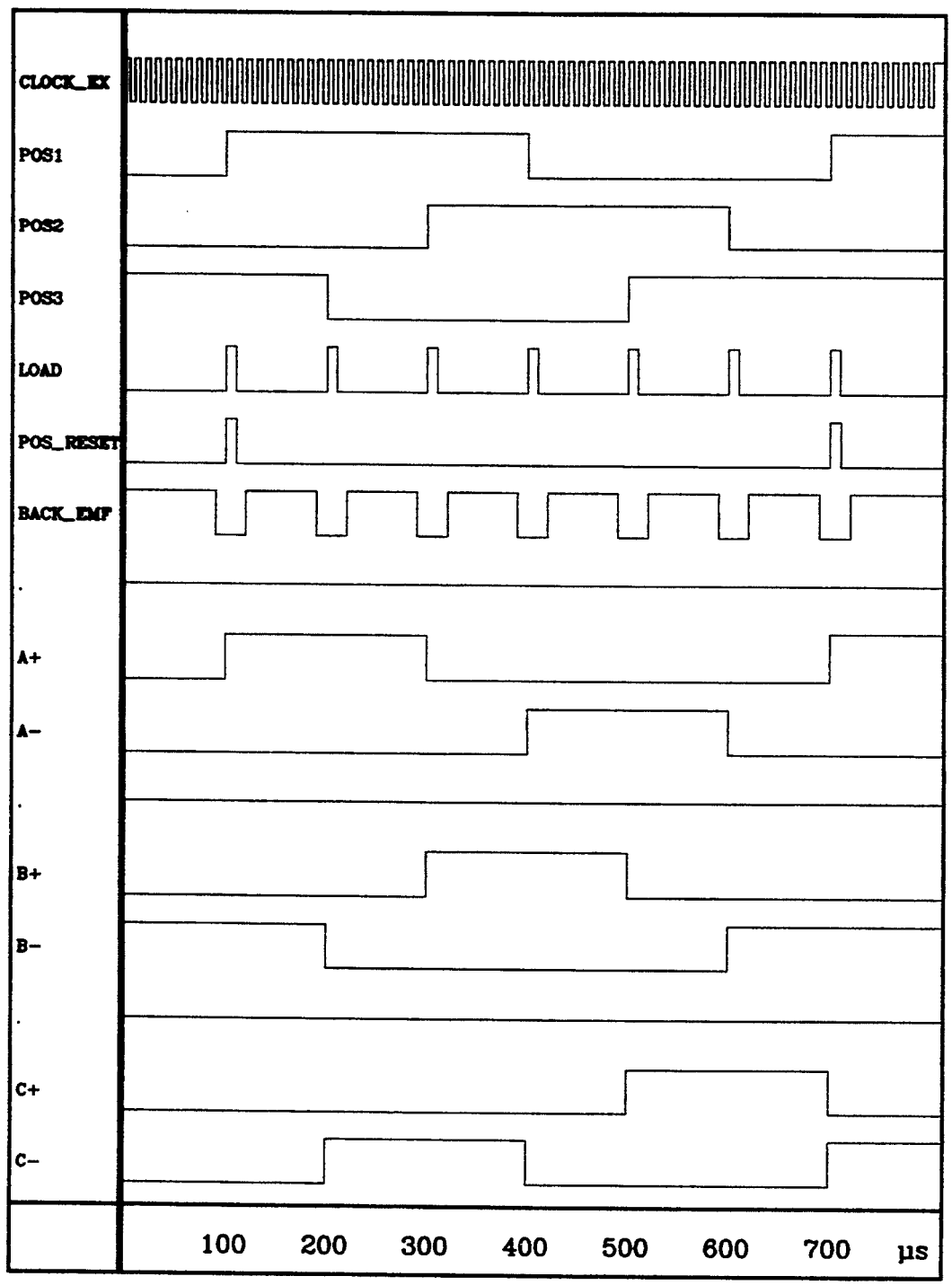
Figure 8B:
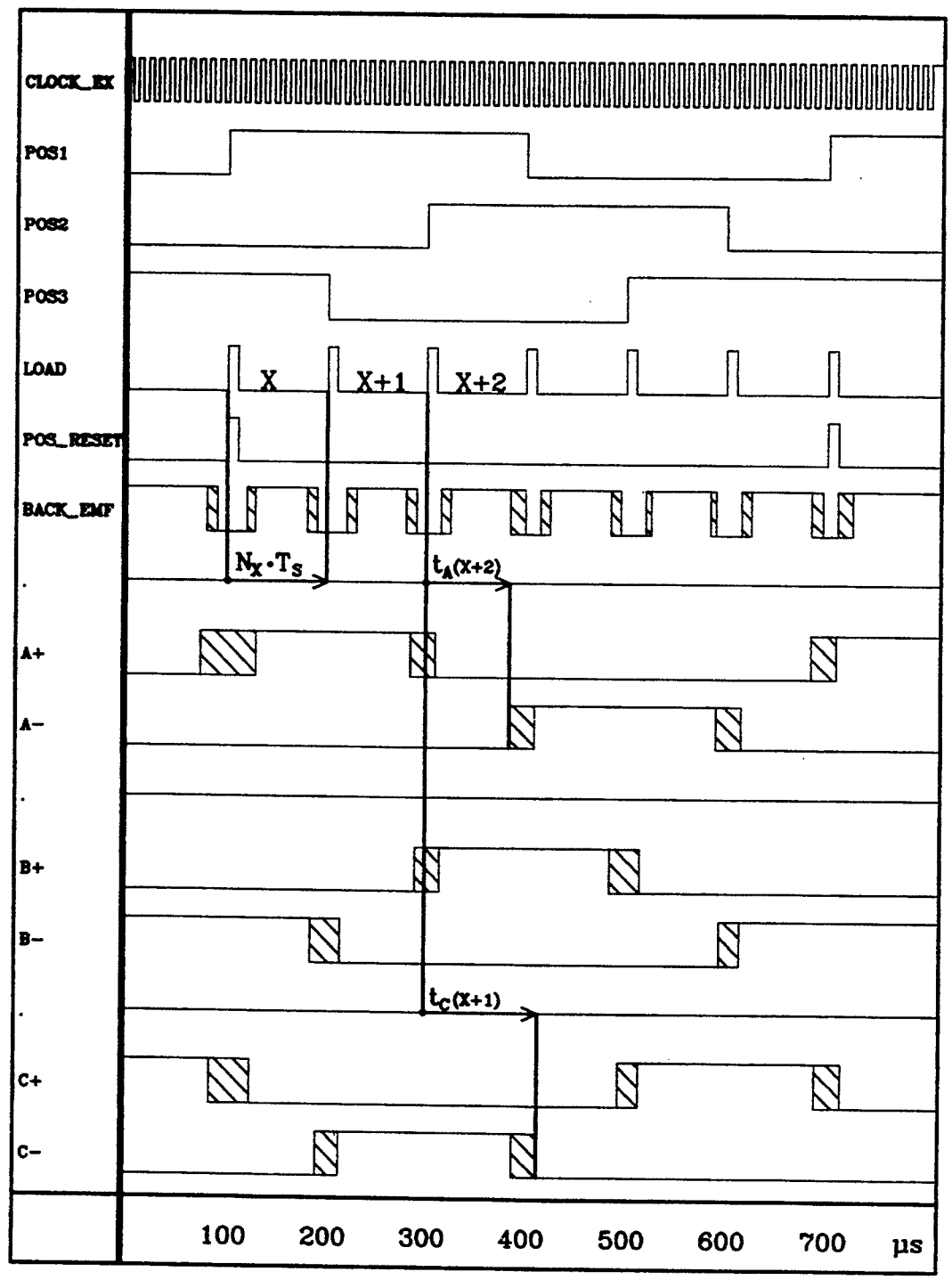
Figure 9:
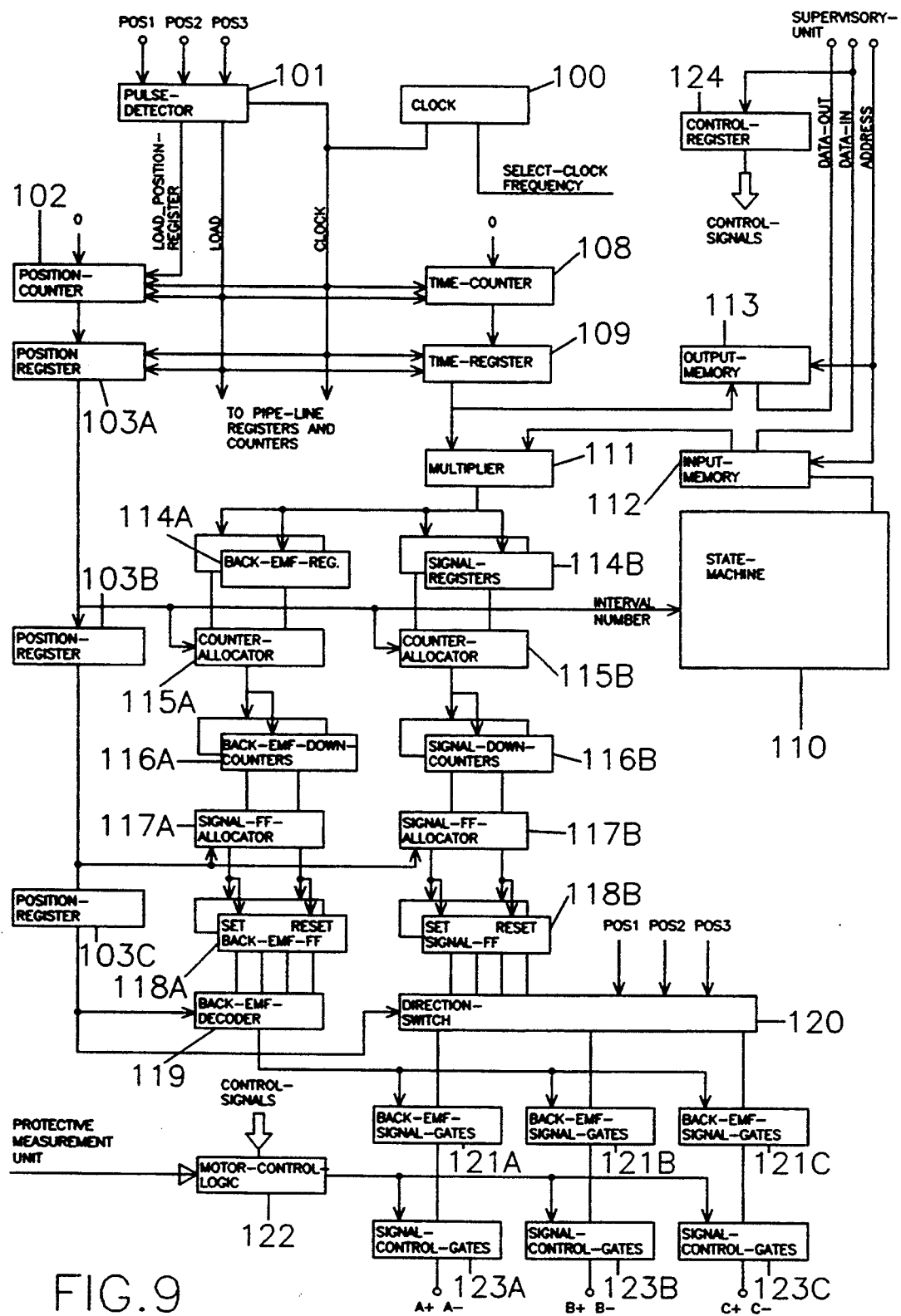
Figure 10:
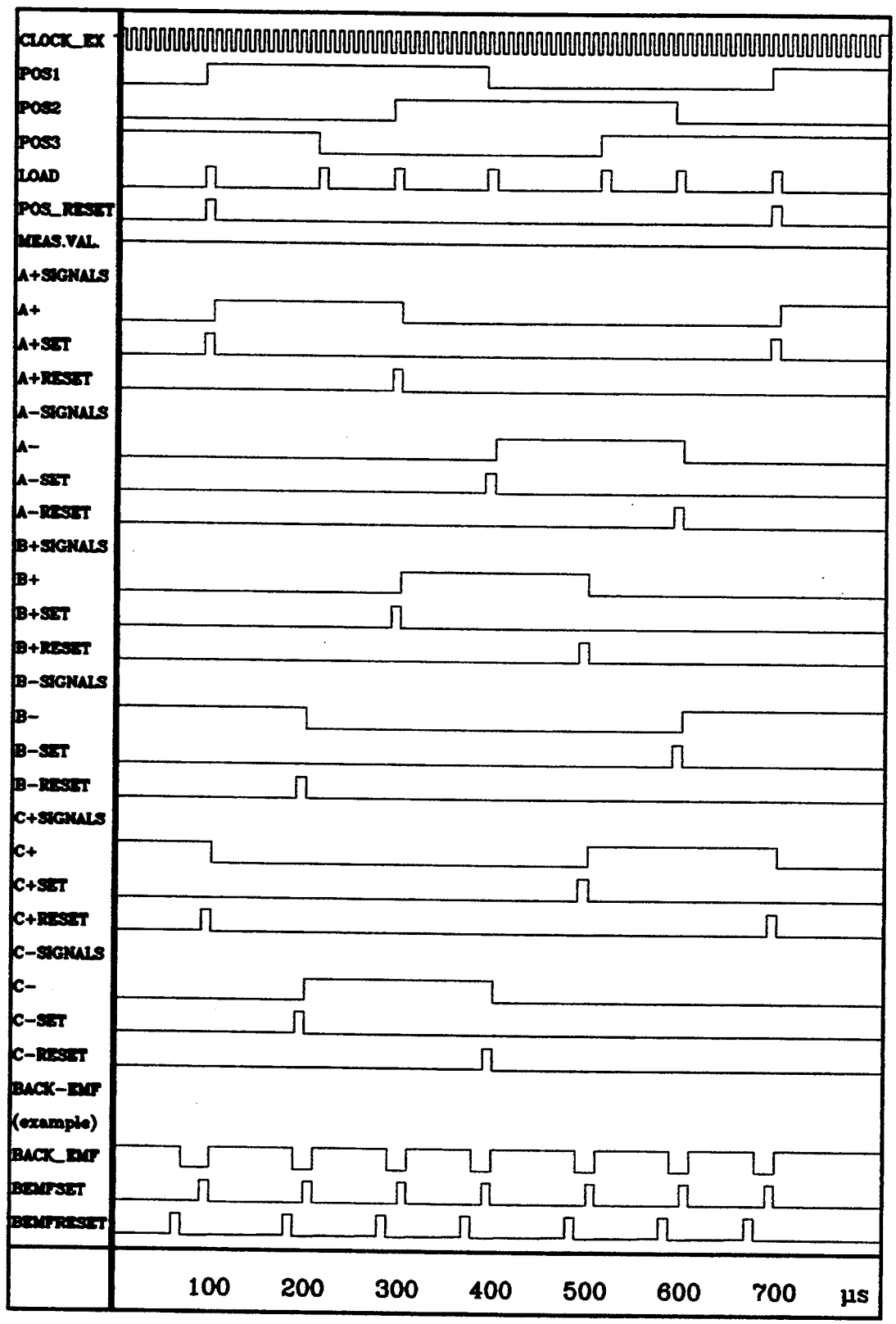

FIG. 5a–e shows timing diagrams for the inverter included in the motor system according to the invention;

FIG. 6 shows position signals and output signals from the motor control unit in a 6-pulse system;

FIG. 7 shows position signals and output signals from the motor control unit in a 12-pulse system;

FIG. 8a shows common commutating positions in a 6-pulse system without optimization which is used with the drive system according to the invention;

FIG. 8b shows a timing diagram for modification of the commutation positions in a 6-pulse system for optimization according to the invention;

FIG. 9 shows a block diagram of the commutation control unit which performs modification of the commutation positions for optimization according to the invention;

FIG. 10 shows a timing diagram of the result of an optimization according to the invention.

A three phase inverter 1 with its outputs R,S and T is connected to respective stator windings 31, 32 and 33 via the lines 51, 52 and 53 where each winding comprises one phase of a preferably permanently magnetized synchronous motor 3 the permanent magnet rotor of which can comprise 2 poles.

The inverter 1 comprises 6 valves which are controlled from the inputs A+–C— which in their turn are connected to corresponding outputs of the control unit 2. On The inputs r,s and t of the control unit 2 are supplied rotor position signals from the back-EMF detector 5 which detects zero passages on the supply lines 51, 52 and 53. The resulting signal pattern from the bask-EMF and corresponding control signals is shown in FIG. 6. The inverter is supplied from a battery 11 via a control unit 10 which operates with pulse width modulation (PWM) from the control unit 2. The function of the control unit 2 is supervised by the supervising unit 4 comprising a μ-processor.

From the μ-interface of the control unit 2 (see FIG. 3) versus the supervising unit 4 there are information signals about current limiting CLT (CURRENT LIMIT), present rotational speed and rotor position including direction of rotation (DATA OUT ).

The control signal SSD (SET SPEED) gives the pulse width modulation a certain ratio corresponding to a certain effective voltage supplied to the inverter 1. The rotational speed of the motor is directly proportional to the supply voltage of the inverter.

The control signals (DATA IN) comprise commands for rotational direction, braking, normal operation and impulse start.

Figure 2:
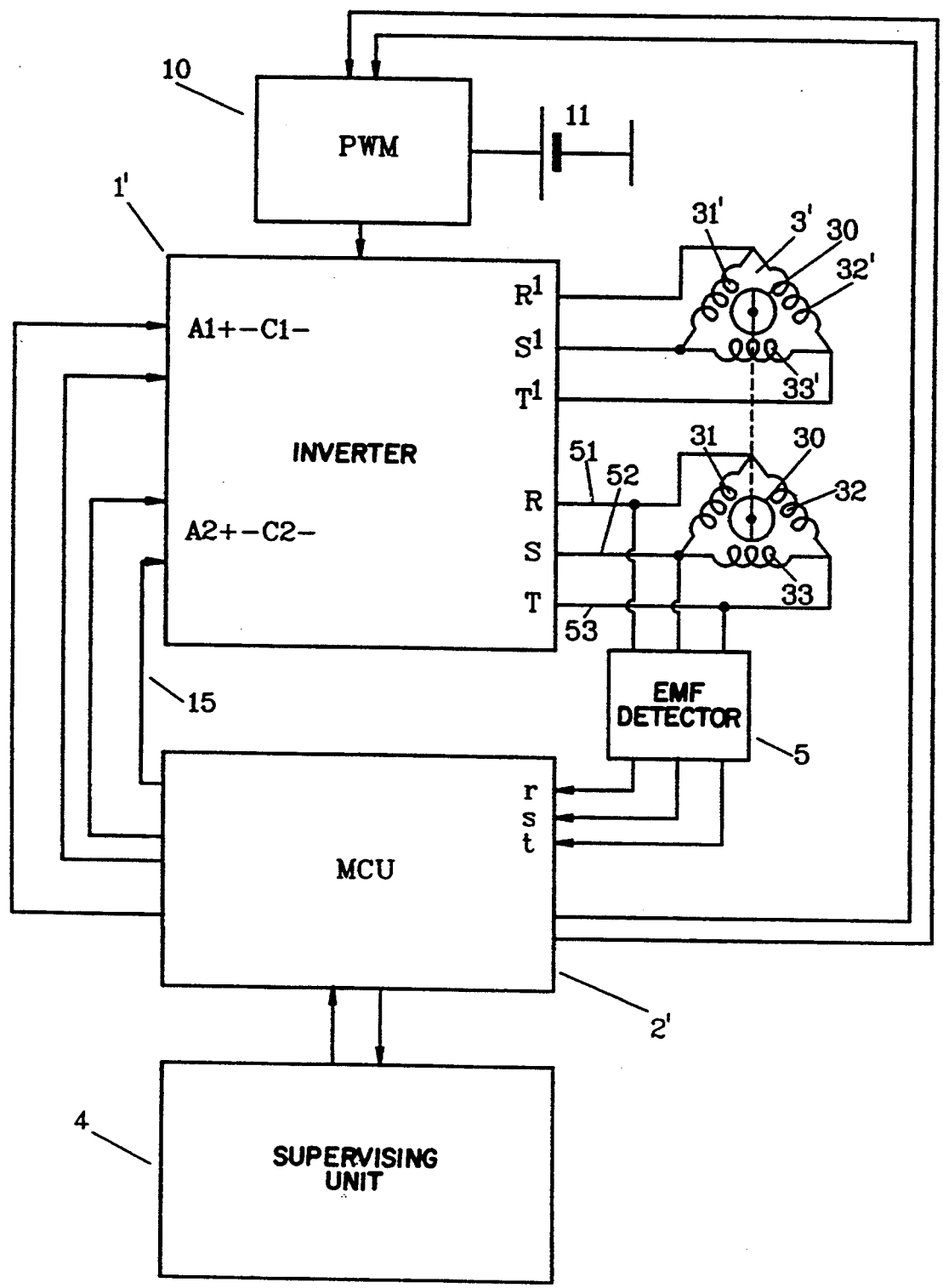
FIG. 2 shows a block diagram in principle over a second embodiment of a motor system comprising a modified inverter according to the invention in which the fifth harmonic has been eliminated.

With reference to FIG. 2 a 12-pulse application of the motor system according to the present invention is shown, which gives an elimination of the fifth harmonic.

The three phase inverter 1' comprises 12 valves which are controlled from the inputs A1+–C1—och A2+–C2— which in turn are connected to corresponding outputs of the control unit 2'. The inverter from its outputs R,S,T and R',S',T' feeds respective sets of stator windings 31,32,33 and 31', 32', 33', in the permanent magnet synchronous motor 3'. The position signals from the back-EMF detector 5 and resulting operating signals are illustrated in FIG. 7.

Figure 1:
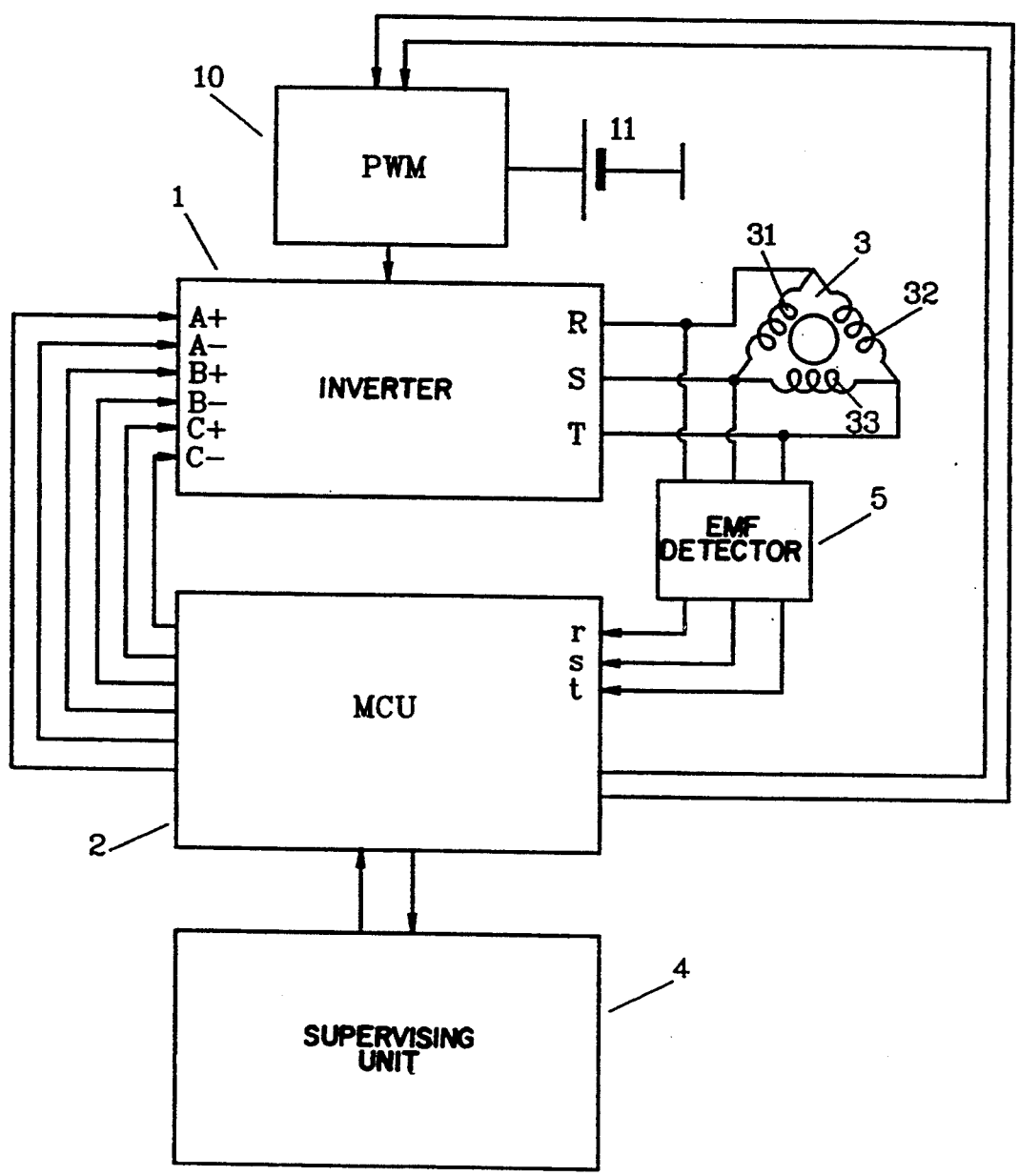
FIG. 1 shows a block diagram in principle over a first embodiment of a motor system comprising an inverter according to the invention.

The operating voltages RST and R',S',T' are 60 degrees displaced with respect to each other and in the resulting stator flow influence of the fifth and seventh harmonics is eliminated with corresponding raise in the efficiency, see further in the specification page 7, eq. 1–4. The motor system according to FIG. 2 for the rest has a function similar to that accounted for i connection to FIG. 1.

Figure 3:
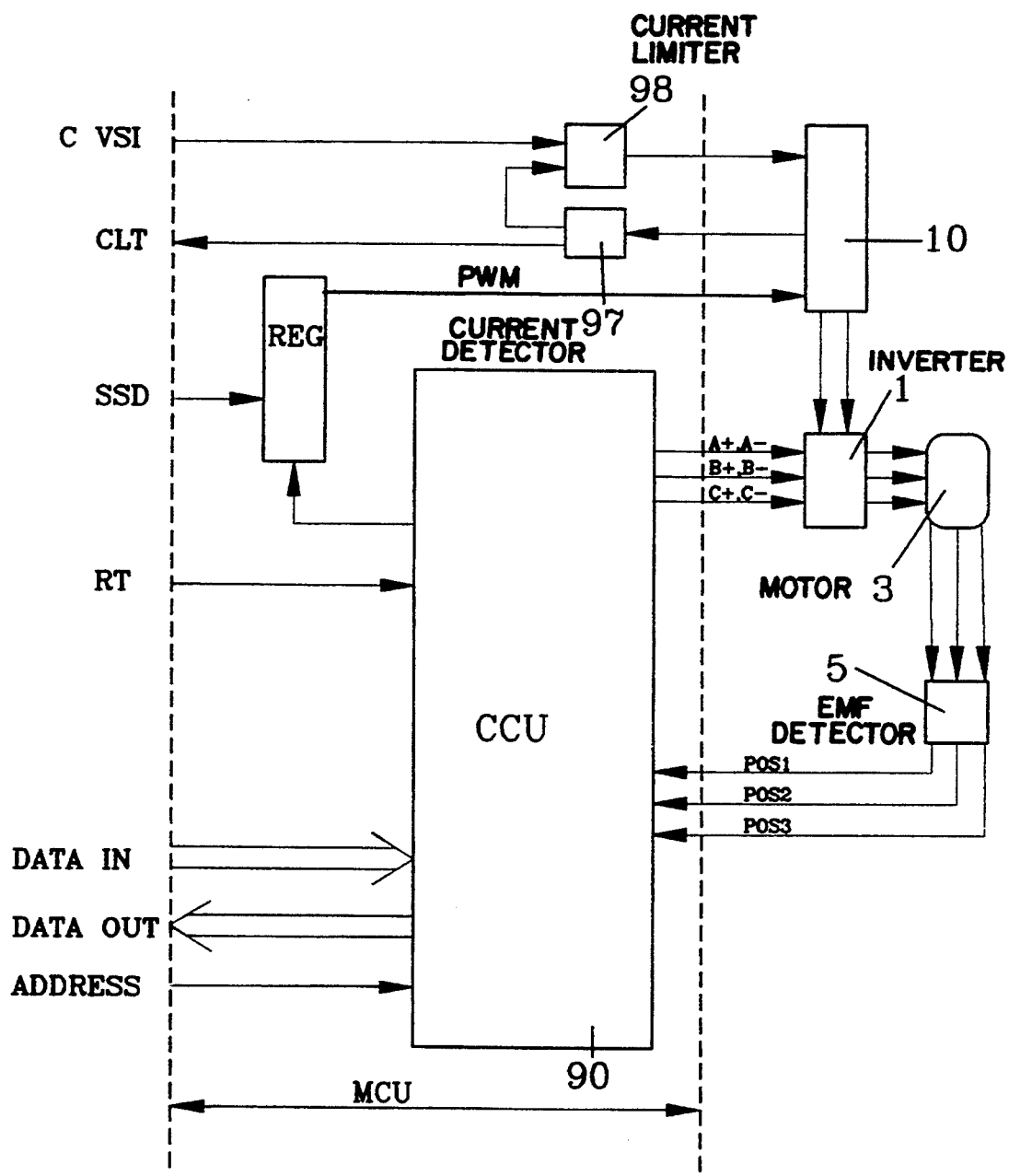
FIG. 3 shows a block diagram of a motor control unit included in the first and second embodiments of the motor drive system according to the invention.

With reference to FIG. 3 a block diagram over the motor control unit 2 is shown, which contains a commutation control unit (CCU) comprising detecting means for rotational direction and velocity as well as means for detecting and controlling the commutating angles. In order to make measuring of the power supplied to the system possible the current can be detected in the current detector 97 and a suitable current be set on the current limiter 98 from the supervising unit 4 by means of the signal CVSI (CURRENT VOLTAGE SOURCE INVERTER). The circuit REG gives pulse width controlled pulses corresponding to the control signal SET SPEED.

Figure 4A:
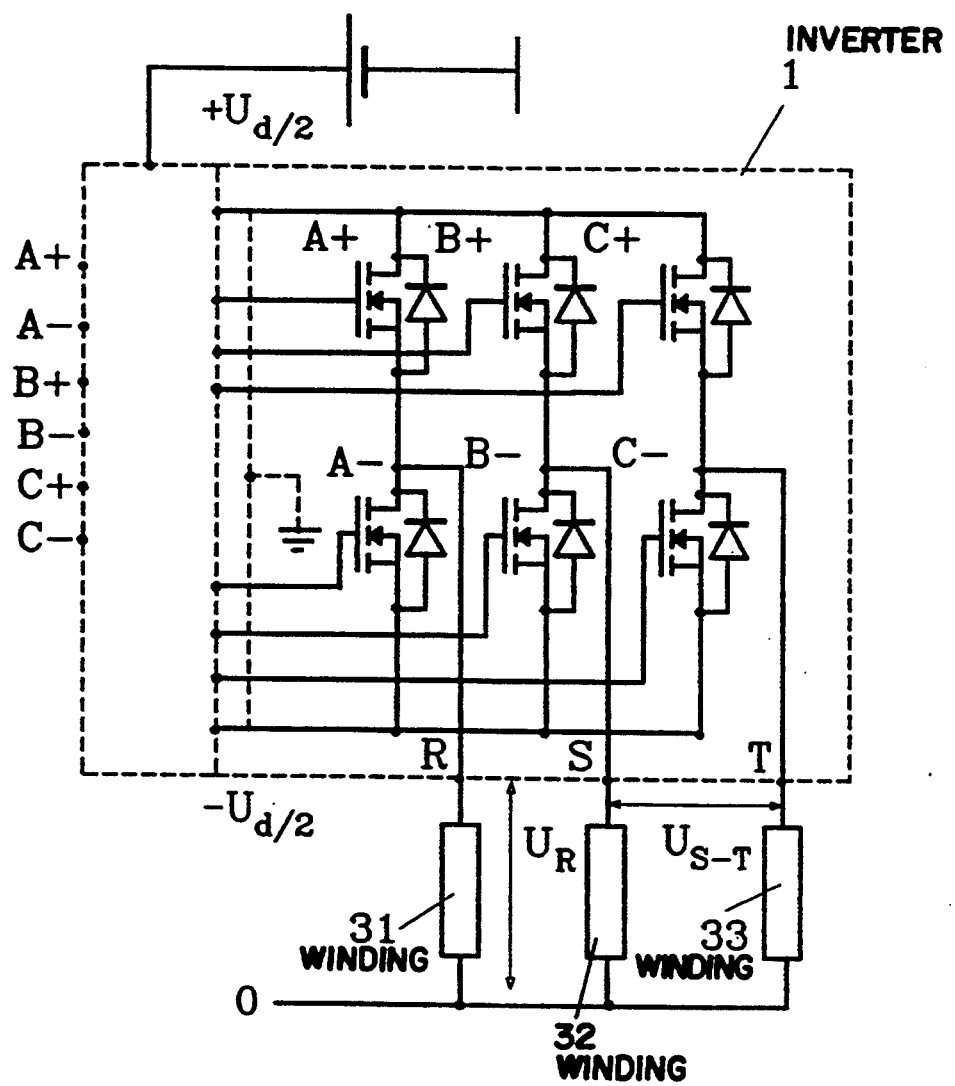
FIG. 4a shows a simplified diagram for the inverter included in the motor system according to the first embodiment of the invention.

With reference to FIG. 4a is shown a basic circuit diagram over the inverter 1, which consists of a three phase bridge with the controllable valves A+, A—, B+, B—, C+, C— which can be constituted by a MOS-transistor with an integrated back diode D. The outputs R, S and T from the three phase bridge are connected respectively to each phase of a synchronous motor with a permanent magnet rotor whereby the phases 31,32,33 with identical, impedances are connected in Y - configuration in order to clearly illustrate the function of the inverter. The three phase bridge is connected to the symmetrical supply voltages $+U_d/2$ and $-U_d/2$.

With reference to FIG. 4 and FIG. 5 the operating principle for the inverter 1 will be described.

On the inputs 10–14 of the inverter 1 signals from the commutation control unit 90 are received in response to detected voltage levels on the supply lines of the permanent magnet motor 3.

Figure 5A:
Figure 5B:
Figure 5C:
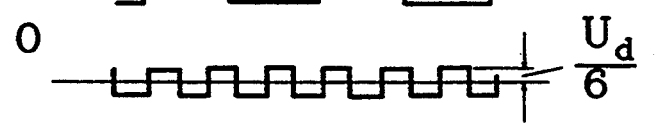

Through digital signal processing in the commutation control unit a set of signals is crested which can be seen in FIG. 5a for generation of the potential wave forms on the alternating current outputs R,S,T according to FIG. 5b. From this can be seen, that these wave forms are three square wave voltages with the amplitude $U_d/Z$ and 120° phase shift. The square wave voltages consist of odd harmonics with the mean square values $$U_{(1)} = 0.9\, U_d/2 = 0.45\, U_d \tag{1}$$

$$U_{(3)} = \tfrac{1}{3} U_{(1)} \tag{2}$$

$$U_{(5)} = 1/5\, U_{(1)} \tag{3}$$

$$U_{(7)} = 1/7\, U_{(1)} \tag{4}$$

and so on. If $V_R$, $V_S$ and $V_T$ are the three phase potentials and $i_R$, $i_S$ and $i_T$ are the corresponding currents through the same impedances Z which connect the AC-terminals to the (real or imaginary) neutral point of the three phase system, the potential of the neutral point can be calculated from $$v_R - v_O = Z\, i_R (= u_R) \tag{5}$$

$$v_S - v_O = Z\, i_S (= u_S) \tag{6}$$

$$v_T - v_O = Z\, i_T (= u_T) \tag{7}$$

The three equations are added. Since the sum of currents is zero, the following is valid $$v_R+v_S+v_T-3v_O=Z(i_R+i_S+i_T)=0 \qquad (8)$$

or $$v_O=(V_R+v_S+v_T)/3$$

The potential wave form of the neutral is a third of the sum of the three phase potential wave forms. It is a square wave, see FIG. 5c with an amplitude of T/3 * ½ $U_d$, and a fundamental frequency which is three times the frequency of the inverter. Therefore it only contains harmonics with the harmonic sequence which are multiples of 3, and the harmonics have the same amplitude and phase as corresponding harmonics of the phase potentials.

Figure 5D:
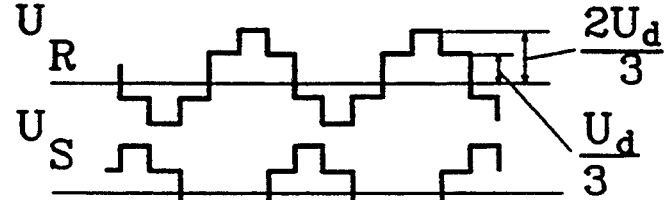
Figure 5E:
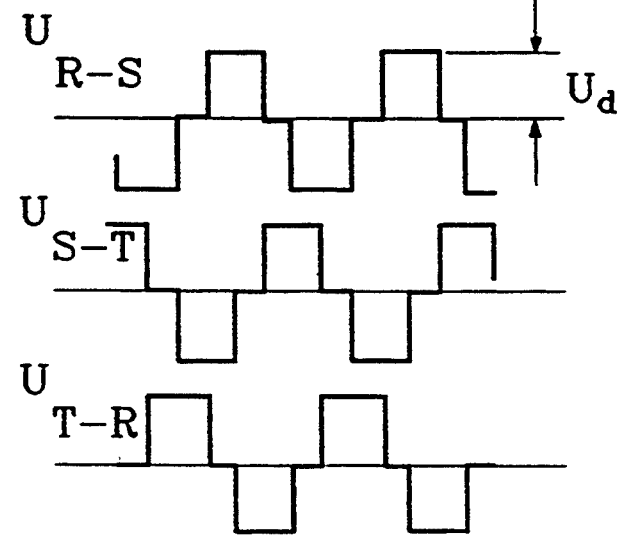

The phase voltages $u_R$, $u_S$, and $u_T$, see FIG. 5d, is the difference between the potentials of R, S, and T and the potential of the neutral point. Of what has been said about the harmonic content of the neutral point, the result is that voltages will contain the same harmonic components as the square waves, which blocks multiples of harmonics of three since these will be eliminated.

The phase to phase voltages or main voltages $u_{R-9}$, $u_{S-T}$, and $u_{T-R}$ can either be calculated as the difference between corresponding phase voltages, e.g. $u_{R-S}=u_R-U_S$, or as the difference between corresponding square wave potentials. The phase to phase voltages are semi square voltages with conduction intervals of 120° and with the same harmonics as the phase voltages, see FIG. 5e.

Figure 4B:
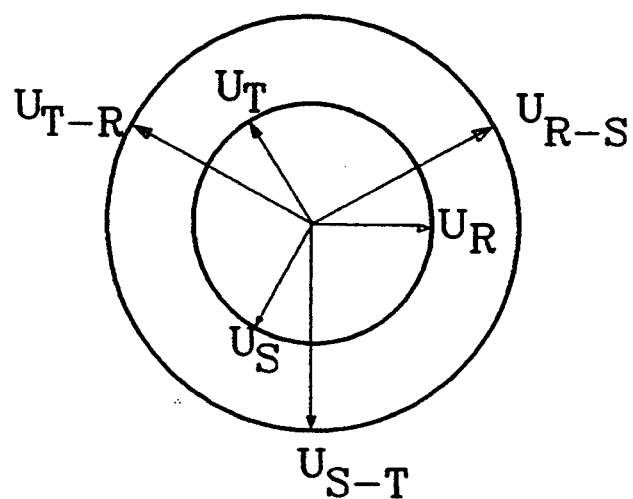
FIG. 4b shows a vector diagram for the inverter included in the motor system according to the invention.

In order to further illustrate the operating principle of the inverter 1 a vector diagram is shown in FIG. 4b for the fundamental components of the phase voltages $u_R$, $u_S$, and $u_T$ and the main voltages $u_{R-S}$, $u_{S-T}$ and $u_{T-R}$.

With reference to the block diagram in FIG. 3 a starting sequence for the motor 3 is described in the following. At zero frequency, that is at idle rotor the back- EMF is equal to zero on the supply lines. According to the invention a first current pulse is given to the rotor via the supervising unit 4 and an activation signal to the DATA IN input of the commutation control unit. As a result of this a stator winding e.g. 31 receives a current pulse which gives rise to an arbitrary magnetic field, whereby if no back-EMF is detected, a second current pulse is supplied through e.g. 32 which produces a magnetic field the direction of which does not coincide with the first. If a back-EMF, that is rotation, thereby is detected in the speed detector of the CCU, which also implies that the direction can be detected in the direction detector of the CCU third current pulse is supplied which produces a magnetic flow which maintains the produced rotation direction (ACTUAL DIRECTION) if this direction is the desired or shifts said direction so that further detected back- EMF on the supply lines gives a set of control signals on the timing logic 93 to obtain the intended rotational speed (SET SPEED).

One of the main functions of the control unit 2 is to make possible an optimization of performance by minimizing power dissipation from the motor at high speed operation of the motor.

According to the invention this optimization is performed by displacing the commutating or the firing points and detecting changes in the input current. Because of unsymmetries in the stator iron, the stator windings and the permanent magnetized rotor the back-EMF or position sensors do not give quite optimal commutating information for all 60 degrees commutating intervals. The displacement of the commutating points is carried out in the commutation control unit 90 which will be described in detail below.

With reference to FIG. 3 the Commutation Control Unit 90 (CCU) forms a part of the Motor Control Unit 2 (MCU). The prime function of the CCU is to control the commutation to give optimum performance of the high speed motor driving system. Input signals are rotor position signals created by sensors or by back-EMF detectors. The electronic commutation control is monitored by a supervisory unit, e.g. a micro-processor, with input data from the CCU. Output data is used to change commutation transition points for different commutation types. Output data is also used to control motor action e.g. start, brake and rotation direction.

The pulse detector 101 creates two signals from the position signals (POS1, POS2, POS3). Each transition of position signals are detected and summarized to a LOAD-signal, which is used to transport data through the CCU-structure. The other signal, POSITION_RESET, is created from the POS1 signal each period at the positive transition. These two signals consists of pulses, which are one clock period long.

The system clock 100 of a frequency of e.g. 10 MHz is used to synchronize the data flow in the CCU. It is also used to measure the time interval between position signal transitions. A lower clock frequency can be selected, to avoid time measurement overflow at low rotation speeds.

The input memory 112 and the output memory 113 are memories which store data that is exchanged between the supervising unit and the motor control unit.

The time counter 108 is reset for each LOAD-pulse. The encountered value is stored in the time register 109 at the same time. The time counter value is an integer, proportional to the distance between two position signal transitions. This value is used in the calculation of commutation position, relative to position signal transitions.

The position counter 102 holds information of which interval in the cycle is measured. There are 6 intervals for each cycle or revolution of the rotor in this embodiment of the invention. The position counter is set to zero by the POSITION_RESET signal. The position value is used to control the multiplication algorithm, to allocate counters, to create phase signals and to control back-EMF gaps to phase signals. Each position has a specific control decoding scheme for 6 or 12-pulse drive systems and for the selected commutation type.

The time register 109 is used to hold data for the multiplication algorithm in each interval. This time value is also transferred to an output memory accessible from the supervisory unit. The sum of six consecutive values comprise a value proportional to the rotor speed, RPM.

The position registers 103A, 103B, 103C, hold the position address for each step in the data processing. It is used to decode the function for each interval in the pipe-lined design structure.

The multiplier unit 111 multiplies the time register value with a binary constant, stored in an input memory 112. The constant has a practical range from 0.0000 to 1.9999, i.e to decrease or increase the time value. The calculated value is stored in a signal register 114A or back-emf register 114 B, to be used when the next interval begins. During one interval several multiplications can be performed, to implement the algorithm for a specific commutation. Time considerations for an example shows the following Rotation speed 100,000 rpm
Cycle time 600 us
Interval time (6 intervals) 100 us
Clock speed 10 MHZ gives 100/0.1 = 1000 instructions The algorithm for each interval, defined by the POSITION value, depends on the type of commutation that is selected. The state machine 110 has a program which can control multiplication for 12 counters in each interval. The result is stored in a register for each counter. The state machine 110 fetches constants from the input memory 112. It also stores the time register value in the output memory 113.

Below is given an example of a program for a 6-pulse drive system according to an embodiment of the invention

```
POSITION 0:
    SIGNAL_REG1 := TIME_REGISTER *
    SIGNAL_CONSTANT_1;
    SIGNAL_REG2 := TIME_REGISTER *
    SIGNAL_CONSTANT_1;
    BEMF_REG1 := TIME_REGISTER *
    BEMF_CONSTANT_1;
    BEMF_REG2 := TIME_REGISTER *
    BEMF_CONSTANT_2;
    OUT_PUT_MEMORY[0] := TIME_REGISTER ;
POSITION 1:
    SIGNAL_REG3 := TIME_REGISTER *
    SIGNAL_CONSTANT_3;
    SIGNAL_REG4 := TIME_REGISTER *
    SIGNAL_CONSTANT_4;
    BEMF_REG3 := TIME_REGISTER *
    BEMF_CONSTANT_3;
    BEMF_REG4 := TIME_REGISTER *
    BEMF_CONSTANT_4;
    OUT_PUT[1] := TIME_REGISTER ;
POSITION 2:
    SIGNAL_REG1 := TIME_REGISTER *
    SIGNAL_CONSTANT_5;
    SIGNAL_REG2 := TIME_REGISTER *
    SIGNAL_CONSTANT_6;
    BEMF_REG1 := TIME_REGISTER *
    BEMF_CONSTANT_5;
    BEMF_REG2 := TIME_REGISTER *
    BEMF_CONSTANT_6;
    OUT_PUT[2] := TIME_REGISTER ;
POSITION 3:
    SIGNAL_REG3 := TIME_REGISTER *
    SIGNAL_CONSTANT_7;
    SIGNAL_REG4 := TIME_REGISTER *
    SIGNAL_CONSTANT_8;
    BEMF_REG3 := TIME_REGISTER *
    BEMF_CONSTANT_7;
    BEMF_REG4 := TIME_REGISTER *
    BEMF_CONSTANT_8;
    OUT_PUT_MEMORY[3] := TIME_REGISTER ;
POSITION 4:
    SIGNAL_REG1 := TIME_REGISTER *
    SIGNAL_CONSTANT_9;
    SIGNAL_REG2 := TIME_REGISTER *
    SIGNAL_CONSTANT_10;
    BEMF_REG1 := TIME_REGISTER *
    BEMF_CONSTANT_9;
    BEMF_REG2 := TIME_REGISTER *
    BEMF_CONSTANT_10;
    OUT_PUT_MEMORY[4] := TIME_REGISTER ;
POSITION 5:
    SIGNAL_REG3 := TIME_REGISTER *
    SIGNAL_CONSTANT_11;
    SIGNAL_REG4 := TIME_REGISTER *
```

-continued
```
    SIGNAL_CONSTANT_12;
    BEMF_REG3 := TIME_REGISTER *
    BEMF_CONSTANT_11;
    BEMF_REG4 := TIME_REGISTER *
    BEMF_CONSTANT_12;
    OUT_PUT_MEMORY[5] := TIME_REGISTER ;
```

The SIGNAL_REG's 1 and 2 respectively BEMF_REG's 3 and 4 are used alternately. In a 12-pulse drive system 4 counters are in use as other 4 are loaded with new values. The back-EMF counter can be used alternately for 6 and 12-pulse drive systems. Some algorithms can use fewer counters, The control register 124 is loaded directly from the supervisory unit 4. This register contains signals to control the following functions Brake
Free-wheel operation
Direction control of rotor
Drive mode with commutation position regulation
Drive mode with direct position signal control
Commutation types
6- or 12 pulse
commutation phase ( e.g. 0, +/−60 degrees) related to position signals
commutation modes, i.e how commutation is performed
Back-EMF signal disconnection
Phase signal polarity
Impulse start mode
Clock frequency selection Each counter has a register that is loaded by the state machine program. These registers hold data until the next interval starts. These registers could be omitted if the value is loaded into the counters. The counters are then enabled, when the next interval starts.

The counter allocator 115A, 115B has a decoding scheme corresponding to each interval, defined by POSITION value to load the correct counter with a new value when the LOAD pulse comes. Some counters, initiated from the previous interval, can still be active.

Counters 116A and 116B are down counters and when they reach zero value, a pulse is generated. This pulse performs a set or reset function on signal flip-flops. The same clock is used for counting down the modified value as measuring the time interval. The count down value represents the time at which a phase signal transition should occur.

There are four counters allocated for back-emf signal generation. These counters are configured as two pairs which are alternately used to create a back-EMF gap at the desired point in the commutation cycle.

The signal flip-flop (FF) allocator 117A and 117B has a decoding scheme corresponding to each interval, defined by the POSITION value to control the set or reset of a phase signal. By means of the down counter pulse is switched to the correct phase signal FF in the defined interval.

A signal flip-flop 118A and 118B is allocated for each signal. These flip-flops are set or reset by a pulse from some of the down counters.

The rotation direction switch 120 is controlled by signals from the control register 124. The direction is controlled by switching phase signal order. An optional drive mode, defined by the control register, is available by switching the position signals directly to the out going phase signals after logical modification for desired commutation type. This mode thus disconnects the phase signals generated by the described data processing steps.

The back-emf signal, the logical sum from BEFF1 and BEFF2, is allocated to the correct phase signal as defined by the POSITION value. The back-EMF signal can be disconnected by a signal from the control register 124.

The back-EMF signal is applied to an AND-gate 121A, 121B and 121C to the appropriate phase signal.

The phase drive control logic 123A, 123B and 123C performs control actions initiated by the supervisory unit 4 or from protective measurement units not shown.

Actions from the supervisory unit, are defined by CONTROL_REGISTER signals.

Brake is performed by short circuit of phase windings.

Free-wheel is performed when phase signals are inactive.

Phase signal polarity.

Start pulses on selected phases to start motor.

The motor control unit 122 can receive a signal from a protective measurement unit outside the CCU. This signal inactivates phase signal drive. The protective signal can e.g. be generated when the motor current exceeds a specific limit value.

With reference to the timing diagram FIG.10, the signal CLOCK_EX is the system clock signal, shown as an example, which time period is to small to be shown on the time scale used. During two load pulses, about 100 μs there are 1000 actual clock periods, 0,1 μs. POS1, POS2, POS3 are position signals from sensors or back-EMF detector 5. LOAD is the sum of POS-signal transition pulses. POS_RESET is the signal pulse for one revolution of the rotor. BACK_EMF is the gap where the back-EMF position signal can be detected. A+,A−,B+,B−,C+,C− are phase signals to the inverter power transistor bridge.

The timing diagram shows the signals that can be modified by the algorithm. These signal transition areas are shown, as an example, with a pattern in the diagram. The modification of each signal is performed with a start reference at the LOAD signal pulse. Both positive and negative transitions can be altered. The change is calculated by the general formula $$t_{p(x+2)} = N_x \cdot k_{p(x+2)} \cdot T_2 \qquad (9)$$

p=the signal identity e.g. A+,A− $N_x$=the number of system clock periods between load pulses for the interval numbered x $k_{p(x+2)}$=the multiplication factor for the p-signal in the (x+2) interval $T_z$=time period for the p-signal in the (x+2) interval The calculation is performed in the (x+1) interval With reference to the timing diagram FIG. 11 this contains CLOCK_EX, system clock with not accurate time scale; POS1, POS2, POS3 position signals as above; LOAD, sum signal pulses of position signals; A+,A−,B+,B−,C+,C− are phase signals to the inverter power transistor bridge; BACK_EMF, signal gap to create back-EMF sensor signals; SET and RESET signals for each phase and back-emf signals. The signals are a result from the time calculation according to the formula defined above.

In the timing diagram FIG. 10 is shown as an example the result of an optimization in which symmetric phase signals are obtained from asymmetric position signals from either sensors or the EMF-detector. The set and reset signals for each phase signal, are generated by logic circuits, initiated by time pulse calculation. A measured previous interval is multiplied by a constant, which modifies a specific signal transition. All measured intervals for a revolution are repeated, or slightly changed because of speed variation. Algorithms for power minimization can be used with commutation position control as described above, as a control variable. The operation is the following:

At the time point 100:

No transition of POS1 signal is occurring at 100, The (A+) signal is set high end the (C+) signal is set low at this point.

At the time point 200:

No transition of POS3 signal is occurring at 200 The (B−) signal is set low and the (C−) signal is set high.

At the time point 300:

No transition of POS2 signal is occurring at 300. The (A+) signal is set low and the (B+) signal is set high.

At the time point 400:

No transition of POS1 signal is occurring at 400, The (A−) signal is set high and the (C−) signal is set low.

At the time point 500:

No transition of POS3 signal is occurring at 500. The (B+) signal is set low and the (C+) signal is set high.

At the time point 600 or O (one period):

No transition of POS2 signal is occurring at 600 or 0. The (A−) Signal is set low and the (B−) signal is set high,

I claim:

1. A method for driving a DC-motor comprising a permanent magnet rotor, an inverter and a position detection mechanism capable of generating rotation dependent logical position signals, the method comprising the steps of:
   a) performing optimization based upon the logical position signals from the position detecting mechanism whereby the commutation points derived from said position signals are each individually displaced by a commutation control unit according to a certain scheme;
   b) detecting the input current level when controlling the commutation for minimum power dissipation in the permanent magnet motor to optimize motor performance by reducing motor vibrations, maximizing motor acceleration, and providing efficient operation at given velocity and load;
   c) applying a digital technique to displace the commutation points individually to a given angle based upon the logical signals, the technique comprising the steps of:
      1) supplying the logical position signals to a pulse detector which creates a first LOAD-signal at each transition of said position signal detected, and a second signal POSITION_RESET from one of said position signals each first and second signals consist of pulses one clock period long;
      2) resetting a time counter for each LOAD-pulse;
      3) storing the encountered value in a time register the time counter value being an integer proportional to the distance between two position signal transitions;
      4) using said value in the calculation of commutation position, relative to position signal transitions;
      5) transferring said value in a time register holding data for a multiplication algorithm;
      6) storing signal constants in an input memory;

7) carrying out the following multiplication program:

```
POSITION 0:
SIGNAL_REG1 := TIME_REGISTER * SIGNAL_CONSTANT_1;
SIGNAL_REG2 := TIME_REGISTER * SIGNAL_CONSTANT_2;
BEMF_REG1 := TIME_REGISTER * BEMF_CONSTANT_1;
BEMF_REG2 := TIME_REGISTER * BEMF_CONSTANT_2;
OUT_PUT_MEMORY[0] := TIME_REGISTER ;
POSITION 1:
SIGNAL_REG3 := TIME_REGISTER * SIGNAL_CONSTANT_3;
SIGNAL_REG4 := TIME_REGISTER * SIGNAL_CONSTANT_4;
BEMF_REG3 := TIME_REGISTER * BEMF_CONSTANT_3;
BEMF_REG4 := TIME_REGISTER * BEMF_CONSTANT_4;
OUT_PUT_MEMORY[1] := TIME_REGISTER ;
POSITION 2:
SIGNAL_REG1 := TIME_REGISTER * SIGNAL_CONSTANT_5;
SIGNAL_REG2 := TIME_REGISTER * SIGNAL_CONSTANT_6;
BEMF_REG1 := TIME_REGISTER * BEMF_CONSTANT_5;
BEMF_REG2 := TIME_REGISTER * BEMF_CONSTANT_6;
OUT_PUT_MEMORY[2] := TIME_REGISTER ;
POSITION 3:
SIGNAL_REG3 := TIME_REGISTER * SIGNAL_CONSTANT_7;
SIGNAL_REG4 := TIME_REGISTER * SIGNAL_CONSTANT_8;
BEMF_REG3 := TIME_REGISTER * BEMF_CONSTANT_7;
BEMF_REG4 := TIME_REGISTER * BEMF_CONSTANT_8;
OUT_PUT_MEMORY[3] := TIME_REGISTER ;
POSITION 4:
SIGNAL_REG1 := TIME_REGISTER * SIGNAL_CONSTANT_9;
SIGNAL_REG2 := TIME_REGISTER * SIGNAL_CONSTANT_10;
BEMF_REG1 := TIME_REGISTER * BEMF_CONSTANT_9;
BEMF_REG2 := TIME_REGISTER * BEMF_CONSTANT_10;
OUT_PUT_MEMORY[4] := TIME_REGISTER ;
POSITION 5:
SIGNAL_REG3 := TIME_REGISTER * SIGNAL_CONSTANT_11;
SIGNAL_REG4 := TIME_REGISTER * SIGNAL_CONSTANT_12;
BEMF_REG3 := TIME_REGISTER * BEMF_CONSTANT_11;
BEMF_REG3 := TIME_REGISTER * BEMF_CONSTANT_12;
OUT_PUT_MEMORY[5] := TIME_REGISTER ;
```

8) loading signal down counters and bemf down counters with an allocated new value when receiving the LOAD-pulse;

9) counting down said down counters and at zero value a pulse is generated respectively;

10) said pulse sets or resets signal and bemf flip-flops whereby respective count down value represents the time at which a phase signal transition should occur.

2. The method according to claim 1 wherein rotor is started rotating by the steps of:
 a) applying a short first current pulse in the stator winding for generating an arbitrary magnetic field
 b) if no rotor rotation is detected, applying a second current pulse for generating a magnetic field which does not coincide with the direction of the first generated magnetic field;
 c) if rotor rotation is detected, applying a third current pulse for maintaining the rotation if the rotation is in an intended direction; and
 d) shifting the rotation direction such that further detected rotation signals may directly and indirectly control the drive system in order to reach an intended rotation speed.

3. A motor drive system for driving a DC motor, the motor comprising stator windings, a permanent magnet rotor, and an inverter, the drive system comprising:
 a) stator means of the motor comprising two sets of phase windings driven by the inverter, the inverter emitting first, second, and third phase voltage square waves with a 180° commutating angle and a phase displacement of 60° between the first and second sets of voltage waves in order to suppress the fifth and seventh harmonics in the stator of the motor;
 b) control unit means to control the inverter the output of the inverter comprising three phase square waves with a 180° commutating angle which drive the motor;
 c) supervise unit means for monitoring the inverter;
 d) voltage source means for supplying a pulse width modulated constant voltage, connected to the motor;
 e) inverter means for inverting current, the inverter means being supplied from the voltage source means;
 f) back-EMF detection circuit means for detecting a back-EMF voltage induced by the rotor in the stator windings during a time given by the control unit means in response to output signals from the back-EMF detection circuit means the back-EMF detect circuit means connected between the voltage source means and the control unit means;
 g) detection means for detecting the speed and position of the rotor in order to emit information signals to the supervise unit means at a start of the rotor rotation in response to a start impulse and a direction command sent from the supervising unit to a timing logic in the commutation control unit; and
 h) commutation control unit means for displacing the commutation times, the commutation control unit comprising a time counter means which counts clock pulses from a reference oscillator between time intervals obtained from a pulse detect circuit means, the time intervals corresponding to successive zero crossings detected by the back-EMF detect circuit means, whereby after a multiplication with a signal constant in an input memory the result is counted down with the clock frequency reference oscillator means in a down counter means, the down counter means giving modified time for activation of flip-flop means for creation of modified control signals.

* * * * *